(12) United States Patent
Battegazzore et al.

(10) Patent No.: US 12,291,614 B2
(45) Date of Patent: May 6, 2025

(54) FLUOROPOLYMER HYBRID COMPOSITE

(71) Applicants: SYENSQO SA, Brussels (BE); POLITECNICO DI TORINO, Turin (IT)

(72) Inventors: Daniele Battegazzore, Alessandria (IT); Alberto Frache, Alessandria (IT); Julio A. Abusleme, Saronno (IT); Giambattista Besana, Mariano Comense (IT)

(73) Assignees: SYENSQO SA, Brussels (BE); POLITECNICO DI TORINO, Turin (IT)

( * ) Notice: Subject to any disclaimer, the term of this patent is extended or adjusted under 35 U.S.C. 154(b) by 553 days.

(21) Appl. No.: 17/637,472

(22) PCT Filed: Oct. 7, 2020

(86) PCT No.: PCT/EP2020/078056
§ 371 (c)(1),
(2) Date: Feb. 23, 2022

(87) PCT Pub. No.: WO2021/069469
PCT Pub. Date: Apr. 15, 2021

(65) Prior Publication Data
US 2022/0282012 A1   Sep. 8, 2022

(30) Foreign Application Priority Data
Oct. 9, 2019 (EP) ..................................... 19202147

(51) Int. Cl.
*C08J 5/22* (2006.01)
*C08F 214/22* (2006.01)
*H01M 10/056* (2010.01)

(52) U.S. Cl.
CPC .......... *C08J 5/2237* (2013.01); *C08F 214/225* (2013.01); *H01M 10/056* (2013.01); *C08F 2800/10* (2013.01); *C08J 2327/16* (2013.01); *H01M 2300/0065* (2013.01); *H01M 2300/0091* (2013.01)

(58) Field of Classification Search
USPC ........................................................... 521/27
See application file for complete search history.

(56) References Cited

FOREIGN PATENT DOCUMENTS

| | | |
|---|---|---|
| EP | 3401356 A1 | 11/2018 |
| WO | 2011121078 A1 | 10/2011 |
| WO | 2013160240 A1 | 10/2013 |
| WO | 2014067816 A1 | 5/2014 |
| WO | WO2015169834 A1 * | 11/2015 ............. C08G 18/62 |
| WO | 2017085101 A1 | 5/2017 |

* cited by examiner

*Primary Examiner* — Fred M Teskin
(74) *Attorney, Agent, or Firm* — Osha Bergman Watanabe & Burton LLP

(57) ABSTRACT

The invention pertains to a process for the manufacture of a polymer electrolyte membrane based on a fluoropolymer hybrid organic/inorganic composite, to a polymer electrolyte obtained thereof and to uses of said polymer electrolyte and membranes obtained therefrom in various applications, especially in electrochemical and in photo-electrochemical applications.

17 Claims, No Drawings

FLUOROPOLYMER HYBRID COMPOSITE

CROSS-REFERENCE TO RELATED APPLICATIONS

This application is a U.S. national stage entry under 35 U.S.C. § 371 of International Application No. PCT/EP2020/078056 filed Oct. 7, 2020, which claims priority to European application No. 19202147.5 filed on Oct. 9, 2019. The entire contents of these applications are explicitly incorporated herein by this reference.

TECHNICAL FIELD

The invention pertains to a process for the manufacture of a polymer electrolyte membrane based on a fluoropolymer hybrid organic/inorganic composite, to a polymer electrolyte obtained thereof and to uses of said polymer electrolyte and membranes obtained therefrom in various applications, especially in electrochemical and in photo-electrochemical applications.

BACKGROUND ART

Organic-inorganic polymer hybrids wherein inorganic solids on a nano or molecular level are dispersed in organic polymers have raised a great deal of scientific, technological and industrial interests because of their unique properties.

To elaborate organic-inorganic polymer hybrid composites, a sol-gel process using metal alkoxides is the most useful and important approach.

By properly controlling the reaction conditions of hydrolysis and polycondensation of metal alkoxydes, in particular of alkoxysilanes (e.g. tetramethoxysilane (TMOS) or tetraethoxysilane (TEOS)), in the presence of pre-formed organic polymers, it is possible to obtain hybrids with improved properties compared to the original compounds. The polymer can enhance the toughness and processability of otherwise brittle inorganic materials, wherein the inorganic network can enhance scratch resistance, mechanical properties and surface characteristics of said hybrids.

Hybrids made from sol-gel technique starting from fluoropolymers, in particular from vinylidene fluoride polymers are known in the art.

For instance, WO 2011/121078 discloses a process for the manufacture of fluoropolymer hybrid organic-inorganic composites wherein at least a fraction of hydroxyl groups of a fluoropolymer are reacted in solution with at least a fraction of hydrolysable groups of a metal compound of formula $X_{4-m}AY_m$ (X is a hydrocarbon group, Y is a hydrolysable group, A is a metal selected from Si, Ti and Zr, m is an integer from 1 to 4). This patent document also mentions that films made of the said hybrid organic/inorganic composites are then swelled with an electrolyte solution comprising a solvent (mixture of ethylene carbonate and propylene carbonate) and an electrolyte ($LiPF_6$). Nevertheless, once the film has been casted, swelling it again with an electrolyte solution is not an easy task, so that final amount of electrolyte solution actually interpenetrated in the separator is relatively low, so as, consequently, the ionic conductivity.

Facing said drawback, WO 2013/160240 discloses the manufacture of the fluoropolymer hybrid organic/inorganic composite in the presence of a liquid medium, to provide a self-standing fluoropolymer film stably comprising and retaining said liquid medium and having outstanding ionic conductivity. When the hybrid organic/inorganic composite is for use as polymer electrolyte separator in electrochemical and photo-electrochemical devices, it may be obtained by a process comprising hydrolysing and/or polycondensing a mixture comprising a fluoropolymer, a metal compound of formula $X_{4-m}AY_m$, an ionic liquid, a solvent for the fluoropolymer, and one electrolytic salt. The resulting liquid mixture is then processed into a film by a solvent casting procedure, and dried to obtain the film.

Unfortunately, preparing films by solvent casting technique requires the use of organic solvents like NMP, DMA and similar which are undesirable in an industrial production processes.

The Applicants have now surprisingly found that it is possible to manufacture polymer electrolytes exhibiting outstanding ionic conductivity based on a hybrid organic/inorganic composite, and that said polymer electrolytes can be suitably processed into films having an improved atomic homogeneity by a process that does not include casting with a solvent, with the further advantage of avoiding the use and the subsequent recovery and disposal of said solvent.

SUMMARY OF INVENTION

It is thus an object of the present invention a process for manufacturing a polymer electrolyte membrane based on a fluoropolymer hybrid organic/inorganic composite, said process comprising the following steps:

(i) providing a mixture that comprises:
   a metal compound of formula (I)

$$X_{4-m}AY_m \quad\quad (I)$$

wherein m is an integer from 1 to 4, A is a metal selected from the group consisting of Si, Ti and Zr, Y is a hydrolysable group selected from the group consisting of an alkoxy group, an acyloxy group and a hydroxyl group, X is a hydrocarbon group, optionally comprising one or more functional groups,
   an electrolyte solution [solution (ES)] comprising at least one metal salt [metal salt (S)] and a liquid medium [medium (L)];
   optionally, at least one acid catalyst; and
   optionally, an aqueous liquid medium [medium (A)];

(ii) partially hydrolysing and/or polycondensing the metal compound of formula (I) by stirring the mixture provided in step (i) until the obtainment of a solid mixture (SM) that comprises a metal compound including one or more inorganic domains consisting of ≡A-O-A≡ bonds and one or more residual hydrolysable groups Y [metal compound (M)], wherein A and Y are as above defined; and (iii) mixing the solid mixture (SM) provided in step (ii) with at least one fluoropolymer [polymer (F)] comprising recurring units derived from at least one fluorinated monomer [monomer (FM)] and at least one monomer comprising at least one hydroxyl group [monomer (OH)], so as to provide a solid composition (SC); and (iv) processing the solid composition (SC) provided in step (iii) in the molten state, so that at least a fraction of hydroxyl groups of the monomer (OH) of polymer (F) reacts with at least a fraction of residual hydrolysable groups Y of said compound (M), so as to obtain a polymer electrolyte membrane comprising a fluoropolymer hybrid organic/inorganic composite including the electrolyte solution (ES).

In another object, the present invention provides a solid composition (SC) comprising the metal compound (M) and the at least one polymer (F), said composition being obtained according to step (iii) of the process as defined above.

In still another object, the present invention provides an alternative process for manufacturing a polymer electrolyte membrane based on a fluoropolymer hybrid organic/inorganic composite, said process comprising the following steps:
(a) providing a mixture that comprises:
  a metal compound of formula (I)

$$X_{4-m}AY_m \quad (I)$$

wherein m is an integer from 1 to 4, A is a metal selected from the group consisting of Si, Ti and Zr, Y is a hydrolysable group selected from the group consisting of an alkoxy group, an acyloxy group and a hydroxyl group, X is a hydrocarbon group, optionally comprising one or more functional groups,
  an electrolyte solution [solution (ES)] comprising at least one metal salt [metal salt (S)] and a liquid medium [medium (L)];
  optionally, at least one acid catalyst; and
  optionally, an aqueous liquid medium [medium (A)]; and
  at least one fluoropolymer [polymer (F)] comprising recurring units derived from at least one fluorinated monomer [monomer (FM)] and at least one monomer comprising at least one hydroxyl group [monomer (OH)];
and
(b) partially hydrolysing and/or polycondensing the metal compound of formula (I) by stirring the mixture provided in step (a) until the obtainment of a solid composition (SCP) that comprises a metal compound including one or more inorganic domains consisting of ≡A-O-A≡ bonds and one or more residual hydrolysable groups Y [metal compound (M)], wherein A and Y are as above defined and at least one polymer (F) as above defined;
and
(c) processing the solid composition (SCP) provided in step (b) in the molten state at least a fraction of hydroxyl groups of the monomer (OH) of polymer (F) reacts with at least a fraction of residual hydrolysable groups Y of said compound (M), so as to obtain a polymer electrolyte membrane comprising a fluoropolymer hybrid organic/inorganic composite including the electrolyte solution (ES).

In another object, the present invention provides a solid composition (SCP) comprising the metal compound (M) and the at least one polymer (F), said composition being obtained according to step (b) of the process as defined above.

A further object of the present invention is a polymer electrolyte membrane that can be obtained by anyone of the processes as defined above.

It has been found that the polymer electrolyte membrane of the present invention, despite being obtained by a process that does not include casting a solution of the polymer in a solvent, is endowed with high conductivity and homogeneity of the atomic distribution throughout its structure, thus avoiding the marked variations in surface composition and creating predictable and efficient ion transport pathways.

DESCRIPTION OF EMBODIMENTS

By the term "solid mixture" or "solid composition" as used herein refers to any composition that is in a solid form. The term "solid mixture" or "solid composition" also encompasses compositions that are highly viscous mixtures in a semi-liquid form or semi-solid form, containing some liquid entrapped in the interstices of the solid matrix. For instance, a solid composition may be in the form of a powder, granule, paste, puree, wet mixture.

The metal compound of formula (I) can comprise one or more functional groups on any of groups X and Y, preferably on at least one group X.

In case compound of formula (I) comprises at least one functional group, it will be designated as functional compound; in case none of groups X and Y comprises a functional group, compound of formula (I) will be designated as non-functional compound (I).

Functional compounds can advantageously provide for a fluoropolymer hybrid organic/inorganic composite having functional groups, thus further modifying the chemistry and the properties of the hybrid composite over native polymer (F) and native inorganic phase.

As non-limitative examples of functional groups, mention can be made of epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

To the aim of obtaining a polymer electrolyte membranes based on fluoropolymer hybrid organic/inorganic composites having functional groups, it is generally preferred that any of groups X of metal compound of formula (I) or more functional groups and that m is an integer of 1 to 3, so that advantageously each A atom, after complete hydrolysis and/or polycondensation in either step ($i_a$) or step ($a_l$) of the processes of the invention, will nevertheless be bound to a group comprising a functional group.

Preferably, X in metal compound of formula (I) is selected from $C_1$-$C_{18}$ hydrocarbon groups, optionally comprising one or more functional groups. More preferably, X in metal compound of formula (I) is a $C_1$-$C_{12}$ hydrocarbon group, optionally comprising one or more functional group.

With the aim of manufacturing a polymer electrolyte membrane based on a fluoropolymer hybrid organic/inorganic composites which can exhibit functional behaviour in terms of hydrophilicity or ionic conductivity, functional group of metal compound of formula (I) will be preferably selected among carboxylic acid group (in its acid, anhydride, salt or halide form), sulfonic group (in its acid, salt or halide form), phosphoric acid group (in its acid, salt, or halide form), amine group, and quaternary ammonium group; most preferred will be carboxylic acid group (in its acid, anhydride, salt or halide form) and sulphonic group (in its acid, salt or halide form).

The selection of the hydrolysable group Y of the metal compound of formula (I) is not particularly limited, provided that it enables in appropriate conditions the formation of a —O-A≡ bond; said hydrolysable group can be notably a halogen (especially a chlorine atom), a hydrocarboxy group, a acyloxy group or a hydroxyl group.

Examples of functional metal compound of formula (I) are notably vinyltriethoxysilane, vinyltrimethoxysilane, vinyltrismethoxyethoxysilane of formula $CH_2$=$CHSi(OC_2H_4OCH_3)_3$, 2-(3,4-epoxycyclohexylethyltrimethoxysilane) of formula:

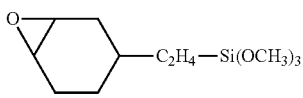

glycidoxypropylmethyldiethoxysilane of formula:

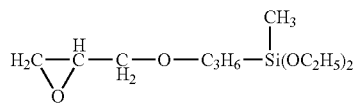

glycidoxypropyltrimethoxysilane of formula:

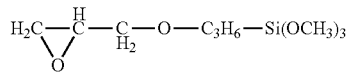

methacryloxypropyltrimethoxysilane of formula:

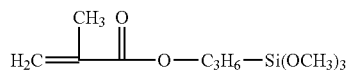

aminoethylaminpropylmethyldimethoxysilane of formula:

aminoethylaminpropyltrimethoxysilane of formula:

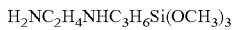

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

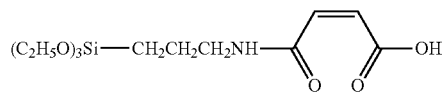

3-(trihydroxysilyl)-1-propane-sulphonic acid of formula $HOSO_2-CH_2CH_2CH_2-Si(OH)_3$, N-(trimethoxysilylpropyl)ethylene-diamine triacetic acid, and its sodium salts, 3-(triethoxysilyl)propylsuccinic anhydride of formula:

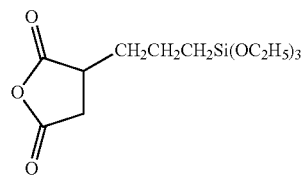

acetamidopropyltrimethoxysilane of formula $H_3C-C(O)NH-CH_2CH_2CH_2-Si(OCH_3)_3$, alkanolamine titanates of formula $Ti(A)_x(OR)_y$, wherein A is an amine-substituted alkoxy group, e.g. $OCH_2CH_2NH_2$, R is an alkyl group, and x and y are integers such that x+y=4.

Examples of non-functional metal compound of formula (I) are notably triethoxysilane, trimethoxysilane, tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

By the term "metal salt (S)", it is hereby intended to denote a metal salt comprising electrically conductive ions.

A variety of metal salts may be employed as metal salts (S). Metal salts which are stable and soluble in the chosen liquid medium (L) are generally used.

Non-limitative examples of suitable metal salts (S) include, notably, MeI, $Me(PF_6)_n$, $Me(BF_4)_n$, $Me(ClO_4)_n$, Me(bis(oxalato)borate)$_n$ ("Me(BOB)$_n$"), $MeCF_3SO_3$, $Me[N(CF_3SO_2)_2]_n$, $Me[N(C_2F_5SO_2)_2]_n$, $Me[N(CF_3SO_2)(R_FSO_2)]_n$ with $R_F$ being $C_2F_5$, $C_4F_9$, $CF_3OCF_2CF_2$, $Me(AsF_6)_n$, $Me[C(CF_3SO_2)_3]_n$, $Me_2S_n$, wherein Me is a metal, preferably a transition metal, an alkaline metal or an alkaline-earth metal, more preferably Me being Li, Na, K, Cs, and n is the valence of said metal, typically n being 1 or 2.

Preferred metal salts(S) are selected from the followings: LiI, $LiPF_6$, $LiBF_4$, $LiClO_4$, lithium bis(oxalato) borate ("Li-BOB"), $LiCF_3SO_3$, $LiN(CF_3SO_2)_2$ ("LiTFSI"), $LiN(C_2F_5SO_2)_2$, $Me[N(CF_3SO_2)(RFSO_2)]_n$ with $R_F$ being $C_2F_5$, $C_4F_9$, $CF_3OCF_2CF_2$, LiAsFe, $LiC(CF_3SO_2)_3$, $Li_2S_n$ and combinations thereof.

By the term "medium (L)" it is hereby intended to denote any liquid that is electrochemically stable and is suitable to solubilize the metal salt (S) to provide the electrolyte solution (ES).

Non-limitative examples of medium (L) suitable to be employed in the processes of the present invention typically include ionic liquids (IL), organic carbonates, and mixture thereof.

Non-limitative examples of suitable organic carbonates include, notably, ethylene carbonate, propylene carbonate, mixtures of ethylene carbonate and propylene carbonate, dimethyl carbonate, diethyl carbonate, ethyl-methyl carbonate, butylene carbonate, vinylene carbonate, fluoroethylene carbonate, fluoropropylene carbonate and mixtures thereof.

According to a second embodiment of the invention, the medium (L) comprises at least one ionic liquid and, optionally, at least one organic carbonate.

For the purpose of the present invention, the term "ionic liquid" is intended to denote a compound formed by the combination of a positively charged cation and a negatively charged anion in the liquid state at temperatures below 100° C. under atmospheric pressure.

The ionic liquid (IL) is typically selected from protic ionic liquid ($IL_p$) and aprotic ionic liquids ($IL_a$).

By the term "protic ionic liquid ($IL_p$)", it is hereby intended to denote an ionic liquid wherein the cation comprises one or more $H^+$ hydrogen ions.

Non-limitative examples of cations comprising one or more $H^+$ hydrogen ions include, notably, imidazolium, pyridinium, pyrrolidinium or piperidinium rings, wherein the nitrogen atom carrying the positive charge is bound to an $H^+$ hydrogen ion.

By the term "aprotic ionic liquid ($IL_a$)", it is hereby intended to denote an ionic liquid wherein the cation is free of $H^+$ hydrogen ions.

The liquid medium typically consists essentially of at least one ionic liquid (IL) and, optionally, at least one additive (A), wherein said ionic liquid (IL) is selected from protic ionic liquids ($IL_p$), aprotic ionic liquids ($IL_a$) and mixtures thereof.

The ionic liquid (IL) is typically selected from those comprising as cation a sulfonium ion or an imidazolium, pyridinium, pyrrolidinium or piperidinium ring, said ring being optionally substituted on the nitrogen atom, in particular by one or more alkyl groups with 1 to 8 carbon atoms, and on the carbon atoms, in particular by one or more alkyl groups with 1 to 30 carbon atoms.

Within the meaning of the present invention, by the term "alkyl group" it is meant saturated hydrocarbon chains or those carrying one or more double bonds and containing 1 to 30 carbon atoms, advantageously 1 to 18 carbon atoms and even more advantageously 1 to 8 carbon atoms. There can be mentioned by way of example the methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

In an advantageous embodiment of the present invention, the cation of the ionic liquid (IL) is selected from the followings:
a pyrrolidinium ring of formula (III) here below:

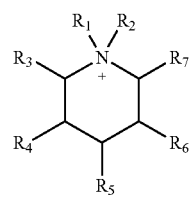

(III)

wherein $R_1$ and $R_2$ each represent independently an alkyl group with 1 to 8 carbon atoms and $R_3$, $R_4$, $R_5$ and $R_6$ each represent independently a hydrogen atom or an alkyl group with 1 to 30 carbon atoms, advantageously 1 to 18 carbon atoms, also more advantageously 1 to 8 carbon atoms, and a piperidinium ring of formula (IV) here below:

(IV)

wherein $R_1$ and $R_2$ each represent independently of each other an alkyl group with 1 to 8 carbon atoms and $R_3$ to $R_7$ each represent independently of each other a hydrogen atom or an alkyl group with 1 to 30 carbon atoms, advantageously 1 to 18 carbon atoms, even more advantageously 1 to 8 carbon atoms.

In a particularly advantageous embodiment of the present invention, the cation of the ionic liquid (IL) is selected from the followings:

(III-a)

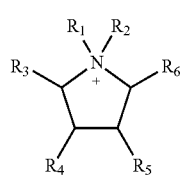

(IV-a)

The ionic liquid (IL) is advantageously selected from those comprising as anion those chosen from halides anions, perfluorinated anions and borates.

The halide anions are in particular selected from the following anions: chloride, bromide, fluoride or iodide.

In a particularly advantageous embodiment of the present invention, the anion of the ionic liquid (IL) is selected from the followings:
bis(trifluoromethylsulphonyl)imide of formula ($SO_2CF_3)_2N-$,
hexafluorophosphate of formula $PF_6-$,
tetrafluoroborate of formula $BF_4-$, and
oxaloborate of formula:

The medium (L) in the electrolyte solution (ES) may further comprise one or more additives.

Should one or more additives be present in the liquid medium, non-limitative examples of suitable additives include, notably, those which are soluble in the liquid medium.

In a preferred embodiment, electrolyte solution (ES) consists of LiTFSI and at least one ionic liquid (IL).

The concentration of LiTFSI in the medium (L) of the electrolyte solution (ES) is advantageously at least 0.01 M, preferably at least 0.025 M, more preferably at least 0.05 M.

The concentration of LiTFSI in the medium (L) of the electrolyte solution (ES) is advantageously at most 3 M, preferably at most 2 M, more preferably at most 1 M.

The electrolyte solution (ES) is typically prepared by dissolving a metal salt (S) in the liquid medium (L) so as to provide an electrolyte solution wherein the concentration of the salt is of advantageously at least 0.01 M, preferably at least 0.025 M, preferably at least 0.05 M and of at most 1 M, preferably 0.75 M, more preferably 0.5 M.

The term "at least one fluorinated monomer [monomer (FM)]" is understood to mean that the polymer (F) may comprise recurring units derived from one or more than one monomers (FM) as defined above. In the rest of the text, the expression "monomer (FM)" is understood, for the purposes of the present invention, both in the plural and the singular, that is to say that they denote both one and more than one monomers (FM) as defined above.

The term "at least one monomer comprising at least one hydroxyl group [monomer (OH)]" is understood to mean that the polymer (F) may comprise recurring units derived from one or more than one monomers (OH) as defined above. In the rest of the text, the expression "monomer (OH)" is understood, for the purposes of the present invention, both in the plural and the singular, that is to say that they denote both one and more than one monomers (OH) as defined above.

The monomer (OH) may be selected from the group consisting of fluorinated monomers comprising at least one hydroxyl group and hydrogenated monomers comprising at least one hydroxyl group.

By the term "fluorinated monomer", it is hereby intended to denote an ethylenically unsaturated monomer comprising at least one fluorine atom.

By the term "hydrogenated monomer", it is hereby intended to denote an ethylenically unsaturated monomer comprising at least one hydrogen atom and free from fluorine atoms.

The polymer (F) comprises preferably at least 0.01% by moles, more preferably at least 0.05% by moles, even more preferably at least 0.1% by moles of recurring units derived from at least one monomer (OH) as defined above.

The polymer (F) comprises preferably at most 20% by moles, more preferably at most 15% by moles, even more preferably at most 10% by moles, most preferably at most 3% by moles of recurring units derived from at least one monomer (OH) as defined above.

Determination of average mole percentage of monomer (OH) recurring units in polymer (F) can be performed by any suitable method. Mention can be notably made of NMR methods.

The monomer (OH) is typically selected from the group consisting of hydrogenated monomers comprising at least one hydroxyl group.

The monomer (OH) is preferably selected from the group consisting of (meth)acrylic monomers of formula (V) or vinylether monomers of formula (VI)

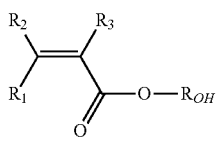

(V)

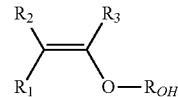

(VI)

wherein each of $R_1$, $R_2$ and $R_3$, equal to or different from each other, is independently a hydrogen atom or a $C_1$-$C_3$ hydrocarbon group, and $R_{OH}$ is a hydrogen atom or a $C_1$-$C_5$ hydrocarbon moiety comprising at least one hydroxyl group.

The monomer (OH) even more preferably complies with formula (V-A):

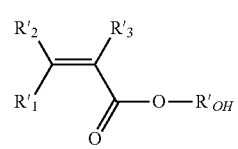

(V-A)

wherein $R'_1$, $R'_2$ and $R'_3$ are hydrogen atoms and $R'_{OH}$ is a $C_1$-$C_5$ hydrocarbon moiety comprising at least one hydroxyl group.

Non-limitative examples of suitable monomers (OH) include, notably, hydroxyethyl (meth)acrylate, hydroxypropyl(meth)acrylate; hydroxyethylhexyl(meth)acrylates.

The monomer (OH) is more preferably selected among the followings:

hydroxyethylacrylate (HEA) of formula:

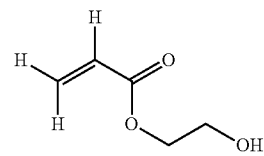

2-hydroxypropyl acrylate (HPA) of either of formulae:

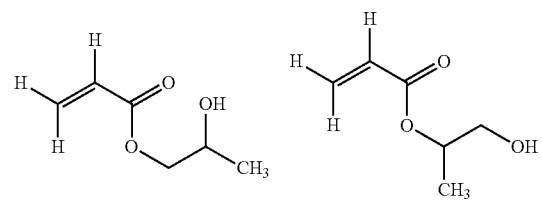

and mixtures thereof.

The monomer (OH) is even more preferably HPA and/or HEA.

The polymer (F) may be amorphous or semi-crystalline.

The term "amorphous" is hereby intended to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

Polymer (F) has notably an intrinsic viscosity, measured at 25° C. in N,N-dimethylformamide, comprised between 0.03 and 0.20 l/g, preferably comprised between 0.05 and 0.18 l/g, more preferably comprised between 0.08 and 0.15 l/g.

Non limitative examples of suitable fluorinated monomers include, notably, the followings:

$C_3$-$C_8$ perfluoroolefins, such as tetrafluoroethylene, and hexafluoropropene;

$C_2$-$C_8$ hydrogenated fluoroolefins, such as vinylidene fluoride, vinyl fluoride, 1,2-difluoroethylene and trifluoroethylene;

perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

(per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;

(per)fluoroalkylvinylethers complying with formula $CF_2=CFOCF_2OR_{f2}$ in which $R_{f2}$ is a $C_1$—C fluoro- or perfluoroalkyl, e.g. $CF_3$, $C_2F_5$, $C_3F_7$ or a $C_1$-$C_6$ (per)fluorooxyalkyl having one or more ether groups, like —$C_2F_5$—O—$CF_3$;

functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;

fluorodioxoles, especially perfluorodioxoles.

Non limitative examples of suitable hydrogenated monomers include, notably, non-fluorinated monomers such as ethylene, propylene, vinyl monomers such as vinyl acetate, acrylic monomers, like methyl methacrylate, butyl acrylate, as well as styrene monomers, like styrene and p-methylstyrene.

The polymer (F) comprises preferably more than 25% by moles, preferably more than 30% by moles, more preferably more than 40% by moles of recurring units derived from at least one fluorinated monomer.

The polymer (F) comprises preferably more than 1% by moles, preferably more than 5% by moles, more preferably more than 10% by moles of recurring units derived from at least one hydrogenated monomer different from monomer (OH).

The fluorinated monomer (FM) can further comprise one or more other halogen atoms (Cl, Br, I). Should the fluorinated monomer be free of hydrogen atoms, it is designated as per(halo)fluoromonomer. Should the fluorinated monomer (FM) comprise at least one hydrogen atom, it is designated as hydrogen-containing fluorinated monomer.

Should the fluorinated monomer (FM) be a hydrogen-containing fluorinated monomer, such as for instance vinylidene fluoride, trifluoroethylene, vinylfluoride, the hydrogen-containing fluoropolymer of the invention can be either a polymer comprising, in addition to recurring units derived from at least one monomer (OH) as defined above, recurring units derived only from said hydrogen-containing fluorinated monomer, or it can be a copolymer comprising recurring units derived from at least one monomer (OH) as defined above, said hydrogen-containing fluorinated monomer and from at least one other monomer.

Should the fluorinated monomer (FM) be a per(halo)fluoromonomer, such as for instance tetrafluoroethylene, chlorotrifluoroethylene, hexafluoropropylene, perfluoroalkylvinylethers, the hydrogen-containing fluoropolymer of the invention is a polymer comprising recurring units derived from at least one monomer (OH) as defined above, recurring units derived from said per(halo)fluoromonomer and from at least one other hydrogenated monomer different from said monomer (OH), such as for instance ethylene, propylene, vinylethers, acrylic monomers.

Preferred polymers (F) are those wherein the fluorinated monomer (FM) is chosen from the group consisting of vinylidene fluoride (VDF), tetrafluoroethylene (TFE), hexafluoropropene (HFP) and chlorotrifluoroethylene (CTFE).

Polymer (F) preferably comprises:

(a) at least 60% by moles, preferably at least 75% by moles, more preferably at least 85% by moles of vinylidene fluoride (VDF);

(b) optionally, from 0.1% to 15% by moles, preferably from 0.1% to 12% by moles, more preferably from 0.1% to 10% by moles of a fluorinated comonomer selected from chlorotrifluoroethylene (CTFE), hexafluoropropene (HFP), tetrafluoroethylene (TFE), trifluoroethylene (TrFE), perfluoromethylvinylether (PMVE) and mixtures therefrom; and (c) from 0.05% to 10% by moles, preferably from 0.1% to 7.5% by moles, more preferably from 0.2% to 3.0% by moles of monomer (OH) having formula (V) as defined above.

The selection of the acid catalyst is not particularly limited. The acid catalyst is typically selected from the group consisting of organic and inorganic acids.

The acid catalyst is preferably selected from the group consisting of organic acids.

Very good results have been obtained with citric acid and with formic acid.

One skilled in the art will recognize that the amount of the acid catalyst to be used in the processes of the invention strongly depends on the nature of the acid catalyst itself.

The amount of the acid catalyst used in the processes of the invention may thus be advantageously of at least 0.1% by weight based on the total weight of the metal compound of formula (I).

In one embodiment of the present invention, the mixture provided in step (i) of the process of the invention includes at least one acid catalyst.

In another embodiment of the present invention, the mixture provided in step (i) of the process of the invention does not include any acid catalyst.

The amount of the acid catalyst optionally used in the processes of the invention is advantageously of at most 40% by weight, preferably of at most 30% by weight based on the total weight of the metal compound of formula (I).

In the processes of the invention, the metal compound of formula (I) may optionally be partially hydrolysed and/or polycondensed in the presence of an aqueous medium [medium (A)].

By the term "aqueous medium", it is hereby intended to denote a liquid medium comprising water which is in the liquid state at 20° C. under atmospheric pressure.

The aqueous medium (A) more preferably consists of water and one or more alcohols. The alcohol included in medium (A) is preferably ethanol.

In step (i) of the process of the invention, the mixture is conveniently prepared by adding into the reactor vessel, preferably in the order indicated here below, the following components as above defined:

the electrolyte solution [solution (ES)],
the metal compound of formula (I),
optionally, the at least one acid catalyst, and,
optionally, the aqueous medium [medium (A)].

The amount of the metal compound of formula (I) used in the process of the invention is such that the mixture of step (i) comprises advantageously at least 20% by weight, preferably at least 25% by weight, more preferably at least 30% by weight of said metal compound of formula (I) based on the total weight of the metal compound of formula (I) and the electrolyte solution (ES) in said mixture.

In one embodiment of the present invention, the mixture provided in step (i) of the process of the invention includes a medium (A) comprising, preferably consisting of, water and one or more alcohols.

The amount of medium (A) in the composition provided in step (i) is not particularly critical.

In a preferred embodiment, the amount of medium (A) is such to represent from 1 to 60%, preferably from 5 to 20% by weight of the composition provided in step (i) of the processes of the invention.

In one embodiment of the present invention, the mixture provided in step (i) of the process of the invention does not include any medium (A).

It is understood that in step (ii) of the process of the invention the hydrolysable groups Y of the metal compound of formula (I) as defined above are partially hydrolysed and/or polycondensed so as to yield a metal compound (M) comprising inorganic domains consisting of ≡A-O-A≡ bonds and one or more residual hydrolysable groups Y.

As this will be recognized by the skilled in the art, the hydrolysis and/or polycondensation reaction usually generates low molecular weight side products, which can be notably water or alcohol, as a function of the nature of the metal compound of formula (I) as defined above.

In step (ii) of the process of the invention the mixture provided in step (i) is stirred to a moderate to vigorous stirring, preferably in the range from 200 to 400 rpm, at a temperature and for a time sufficient to obtain a degree of hydrolysis and/or polycondensation of the metal compound of formula (I) which allows obtaining a solid mixture (SM) while keeping at least a residual fraction of the hydrolysable groups Y in metal compound (M).

The partial hydrolysis and/or polycondensation of the metal compound of formula (I) as defined above is suitably carried out at room temperature or upon heating at temperatures lower than 100° C. Temperatures between 20° C. and 90° C., preferably between 20° C. and 70° C. will be preferred.

In step (ii) the stirring time is not particularly limited, but is usually a time comprised in the range of from 10 minutes to 50 hours.

In a preferred embodiment according to the present invention, step (ii) is carried out by subjecting the mixture provided in step (i) to a vigorous stirring in the range from 200 to 400 rpm at a temperature of at least 30° C. for a time comprised in the range of from 24 to 48 hours.

In a preferred embodiment of the present invention, the vigorous stirring in step (ii) is carried out at a temperature ranging from 30° C. to 70° C.

Residual water and/or alcohol by-product formed during the hydrolysis and/or polycondensation reaction and/or residual aqueous liquid medium (A) may still be present in the solid mixture (SM) at the end of step (ii). An additional drying step may thus be included to remove those residual liquids.

In one embodiment of the present invention, step (ii) of the process as above defined thus includes a further step $(ii_{bis})$ of drying the solid mixture (SM) obtained in step (ii) at a temperature of at least 60° C.

The atmosphere in which step $(ii_{bis})$ is carried out is not particularly limited. For example, the step $(ii_{bis})$ may be carried out in an air atmosphere or a nitrogen atmosphere.

Drying step $(ii_{bis})$ may be suitably carried out in a ventilated oven, a fluidized bed, a rotary furnace, a fixed bed etc.

Drying step $(ii_{bis})$ is suitably carried out at a temperature ranging from 60° C. to 90° C. for a time comprised in the range of from 2 to 50 hours.

In a preferred embodiment according to the present invention, the process of the present invention comprises a further step $(ii_{ter})$ of comminuting the solid mixture obtained in step (ii) or in step $(ii_{bis})$, so as to provide the solid mixture (SM) in the form of fine powder.

With reference to the solid mixture (SM), by the term "fine powder" it is hereby intended to denote a powder having average particle size diameter lower than 100 microns, preferably lower than 50 microns, more preferably lower than 20 microns.

Any milling method and apparatus known to the skilled persons can be used in this additional comminuting step $(ii_{ter})$.

The solid mixture (SM) in the form of fine powder has advantages in terms of handling and feeding the equipment used in the following steps of the process.

Accordingly, a preferred embodiment of the present invention provides a process for manufacturing a polymer electrolyte membrane based on a fluoropolymer hybrid organic/inorganic composite, said process comprising the following steps:
(i) providing a mixture that comprises:
a metal compound of formula (I)

$$X_{4-m}AY_m \qquad (I)$$

wherein m is an integer from 1 to 4, A is a metal selected from the group consisting of Si, Ti and Zr, Y is a hydrolysable group selected from the group consisting of an alkoxy group, an acyloxy group and a hydroxyl group, X is a hydrocarbon group, optionally comprising one or more functional groups,
an electrolyte solution [solution (ES)] comprising at least one metal salt [metal salt (S)] and a liquid medium [medium (L)];
optionally, at least one acid catalyst; and
optionally, an aqueous liquid medium [medium (A)];
(ii) partially hydrolysing and/or polycondensing the metal compound of formula (I) by stirring the mixture provided in step (i) until the obtainment of a solid mixture (SM) that comprises a metal compound including one or more inorganic domains consisting of ≡A-O-A≡ bonds and one or more residual hydrolysable groups Y [metal compound (M)], wherein A and Y are as above defined;
and
$(ii_{bis})$ drying the solid mixture (SM) obtained in step (ii) at a temperature of at least 60° C.;
and
$(ii_{ter})$ comminuting the solid mixture (SM) obtained in step $(ii_{bis})$, so as to provide the solid mixture (SM) in the form of fine powder.

In step (iii) of the process of the invention, the solid mixture (SM) obtained according to step (ii) is mixed with at least one fluoropolymer [polymer (F)] comprising recurring units derived from at least one fluorinated monomer

[monomer (FM)] and at least one monomer comprising at least one hydroxyl group [monomer (OH)] to provide solid composition (SC).

Solid composition (SC) provided in step (iii) of the process of the invention preferably comprises polymer (F) in an amount comprised between 5% and 99.99% by weight, preferably between 10% and 50% by weight based on the total weight of solid composition (SC).

Any equipment suitable for obtaining the mixing of powders can be used in step (iii) of the process of the invention.

Solid composition (SC) can be suitably stocked and stored for future uses, with advantages in terms of process optimization.

In step (iv) of the process of the invention, solid composition (SC) is melted by treatment at temperatures typically between 100° C. and 300° C., preferably between 120° C. and 250° C., as a function of the melting point of the polymer (F) and of the nature of the electrolyte solution (ES).

In said step (iv), the polymer (F) and the metal compound (M) are reacted in the molten state typically using melt-processing techniques.

Preferred melt-processing technique used in step (iv) of the process is extrusion at temperatures generally comprised between 100° C. and 3000° C., preferably between 120° C. and 250° C.

The reaction in step (iv) of the process of the invention usually takes place in the twin screw extruder. Surplus reaction heat is commonly dissipated through the barrel wall.

It is understood that, in this step (iv) of the process of the invention, at least a fraction of the hydroxyl groups of the polymer (F) and at least a fraction of the residual hydrolysable groups Y of the metal compound (M)] are reacted so as to yield a fluoropolymer hybrid composite consisting of organic domains consisting of chains of polymer (F) and inorganic domains consisting of ≡A-O-A≡ bonds, thus providing a polymer electrolyte comprising a fluoropolymer hybrid organic/inorganic composite already including the electrolyte solution (ES).

The fluoropolymer hybrid organic/inorganic composite comprised in the polymer electrolyte obtained from the process of the invention advantageously comprises from 0.01% to 60% by weight, preferably from 0.1% to 40% by weight of inorganic domains consisting of ≡A-O-A≡ bonds.

In step (iv) of the process of the present invention a polymer electrolyte comprising a fluoropolymer hybrid organic/inorganic composite including the electrolyte solution (ES) is processed in the form of a membrane directly in the extruder so as to provide a polymer electrolyte membrane.

In a second object, the present invention provides a solid composition (SC) comprising the metal compound (M) and the at least one polymer (F), said composition being obtained according to step (iii) of the process as defined above.

In another object, the present invention provides an alternative process for the manufacturing of the polymer electrolyte membrane based on a fluoropolymer hybrid organic/inorganic composite as above defined.

In step (a) of the process of the invention, a mixture is conveniently prepared by adding into the reactor vessel, preferably in the order indicated here below, the following components as above defined:
the electrolyte solution [solution (ES)],
the metal compound of formula (I),
the at least one polymer (F),
optionally, the at least one acid catalyst, and,
optionally, the aqueous medium [medium (A)].

The amount of the metal compound of formula (I) used in the process of the invention is such that the mixture of step (a) comprises advantageously at least 20% by weight, preferably at least 25% by weight, more preferably at least 30% by weight of said metal compound of formula (I) based on the total weight of the metal compound of formula (I) and the electrolyte solution (ES) in said mixture.

In one embodiment of the present invention, the mixture provided in step (a) of the process of the invention includes a medium (A) comprising, preferably consisting of, water and one or more alcohols.

The amount of medium (A) in the composition provided in step (a) is not particularly critical.

In a preferred embodiment, the amount of medium (A) is such to represent from 1 to 60%, preferably from 5 to 20% by weight of the composition provided in step (a) of the processes of the invention.

It is understood that in step (b) of the process of the invention the hydrolysable groups Y of the metal compound of formula (I) as defined above are partially hydrolysed and/or polycondensed so as to yield a metal compound (M) comprising inorganic domains consisting of ≡A-O-A≡ bonds and one or more residual hydrolysable groups Y.

In step (b) of the process of the invention the mixture provided in step (a) is stirred to a moderate to vigorous stirring, preferably in the range from 200 to 400 rpm, at a temperature and for a time sufficient to obtain a degree of hydrolysis and/or polycondensation of the metal compound of formula (I) which allows obtaining a solid composition (SCP) while keeping at least a residual fraction of the hydrolysable groups Y in metal compound (M).

The partial hydrolysis and/or polycondensation of the metal compound of formula (I) as defined above is suitably carried out at room temperature or upon heating at temperatures lower than 100° C. Temperatures between 20° C. and 90° C., preferably between 20° C. and 70° C. will be preferred.

In step (b) the stirring time is not particularly limited, but is usually a time comprised in the range of from 10 minutes to 50 hours.

In a preferred embodiment according to the present invention, step (b) is advantageously carried out by subjecting the mixture provided in step (a) to a vigorous stirring in the range from 200 to 400 rpm at a temperature of at least 30° C. for a time comprised in the range of from 24 to 48 hours.

In a preferred embodiment of the present invention, the vigorous stirring in step (b) is carried out at a temperature ranging from 30° C. to 70° C.

Residual water and/or alcohol by-product formed during the hydrolysis and/or polycondensation reaction and/or residual aqueous liquid medium (A) may still be present in the solid composition (SCP) at the end of step (b). An additional drying step may thus be included to remove those residual liquids.

In one embodiment of the present invention, step (b) of the process as above defined thus includes a further step $(b_{bis})$ of drying the solid composition obtained in step (b) at a temperature of at least 60° C.

The atmosphere in which step $(b_{bis})$ is carried out is not particularly limited. For example, the step $(b_{bis})$ may be carried out in an air atmosphere or a nitrogen atmosphere.

Drying step ($b_{bis}$) may be suitably carried out in a ventilated oven, a fluidized bed, a rotary furnace, a fixed bed, or in any dryers (hot air, dessicant, compressed air, vacuum) available in the market, etc.

Drying step ($b_{bis}$) is suitably carried out at a temperature ranging from 60° C. to 90° C. for a time comprised in the range of from 2 to 50 hours.

One skilled in the art will recognize that the total time in step (b) for obtaining a solid composition (SCP) starting from the mixture provided in step (a) strongly depends on the amount of liquid present in said mixture.

In a preferred embodiment according to the present invention, the process of the present invention comprises a further step ($b_{ter}$) of comminuting the solid mixture obtained in step (b) or in step ($b_{bis}$), so as to provide the solid mixture in the form of fine powder.

With reference to solid composition (SCP), by the term "fine powder" it is hereby intended to denote a powder having average particle size diameter lower than 100 microns, preferably lower than 50 microns, more preferably lower than 20 microns.

Any milling method and apparatus known to the skilled persons can be used in this additional comminuting step ($b_{ter}$).

According to said preferred embodiment, the present invention provides a process for manufacturing a polymer electrolyte membrane based on a fluoropolymer hybrid organic/inorganic composite, said process comprising the following steps:

(a) providing a mixture comprising:
a metal compound of formula (I)

$$X_{4-m}AY_m \qquad (I)$$

wherein m is an integer from 1 to 4, A is a metal selected from the group consisting of Si, Ti and Zr, Y is a hydrolysable group selected from the group consisting of an alkoxy group, an acyloxy group and a hydroxyl group, X is a hydrocarbon group, optionally comprising one or more functional groups, an electrolyte solution [solution (ES)] comprising at least one metal salt [metal salt (S)] and a liquid medium [medium (L)];
optionally, at least one acid catalyst;
optionally, an aqueous liquid medium [medium (A)]; and
at least one fluoropolymer [polymer (F)] comprising recurring units derived from at least one fluorinated monomer [monomer (FM)] and at least one monomer comprising at least one hydroxyl group [monomer (OH)];

(b) partially hydrolysing and/or polycondensing the metal compound of formula (I) by stirring the mixture provided in step (a) until the obtainment of a solid composition (SCP) that comprises a metal compound including one or more inorganic domains consisting of ≡A-O-A≡ bonds and one or more residual hydrolysable groups Y [metal compound (M)], wherein A and Y are as above defined;
and
($b_{bis}$) drying the solid composition obtained in step (b) at a temperature of at least 60° C.;
and
($b_{ter}$) comminuting the solid mixture obtained in step ($b_{bis}$), so as to provide the solid composition (SCP) in the form of fine powder.

Solid composition (SCP) preferably comprises polymer (F) in an amount comprised between 5% and 99.99% by weight, preferably between 10% and 50% by weight based on the total weight of solid composition (SCP).

Solid composition (SCP) can be suitably stocked and stored for future uses, with advantages in terms of process optimization.

The Applicants have surprisingly found that solid composition (SCP) is particularly easy-flowing, which makes it easier to be stored and particularly advantageous in terms of handling, which makes the feeding of the equipment wherein the next step in molten state takes place particularly easy and efficient.

In step (c) of the process of the invention, solid composition (SCP) is melted by treatment at temperatures typically between 100° C. and 300° C., preferably between 120° C. and 250° C., as a function of the melting point of the polymer (F) and of the nature of the electrolyte solution (ES).

In said step (c), the polymer (F) and the metal compound (M) are reacted in the molten state typically using melt-processing techniques.

Preferred melt-processing technique used in step (c) of the process is extrusion at temperatures generally comprised between 100° C. and 3000° C., preferably between 120° C. and 250° C.

The reaction in step (c) of the process of the invention usually takes place in the twin screw extruder. Surplus reaction heat is commonly dissipated through the barrel wall.

It is understood that, in this step (c) of the process of the invention, at least a fraction of the hydroxyl groups of the polymer (F) and at least a fraction of the residual hydrolysable groups Y of the metal compound (M)] are reacted so as to yield a fluoropolymer hybrid composite consisting of organic domains consisting of chains of polymer (F) and inorganic domains consisting of ≡A-O-A≡ bonds, thus providing a polymer electrolyte comprising a fluoropolymer hybrid organic/inorganic composite already including the electrolyte solution (ES).

The fluoropolymer hybrid organic/inorganic composite comprised in the polymer electrolyte obtained from the process of the invention advantageously comprises from 0.01% to 60% by weight, preferably from 0.1% to 40% by weight of inorganic domains consisting of ≡A-O-A≡ bonds.

In step (c) of the process of the present invention a polymer electrolyte comprising a fluoropolymer hybrid organic/inorganic composite including the electrolyte solution (ES) is processed in the form of a membrane directly in the extruder so as to provide a polymer electrolyte membrane.

The amount of the metal compound of formula (I) used in the process of the invention is such that the solid composition (SCP) provided in step (b) comprises advantageously at least 0.1% by weight, preferably at least 1% by weight, more preferably at least 5% by weight of compound (M) based on the total weight of the polymer (F) and the compound (M) in said solid composition (SCP).

The amount of the metal compound of formula (I) used in the process of the invention is such that the solid composition (SCP) provided in step (b) comprises advantageously at most 95% by weight, preferably at most 75% by weight, more preferably at most 55% by weight of said compound (M) based on the total weight of the polymer (F) and the compound (M) in said solid composition (SCP).

Solid composition (SCP) provided in step (b) of the process of the invention preferably comprises polymer (F) in an amount comprised between 5% and 99.99% by weight, preferably between 10% and 50% by weight based on the total weight of solid composition (SCP).

In another object, the present invention provides a solid composition (SCP) comprising a metal compound [compound (M)] comprising one or more inorganic domains consisting of ≡A-O-A≡ bonds and one or more residual hydrolysable groups Y, wherein A is a metal selected from the group consisting of Si, Ti and Zr, Y is a hydrolysable group selected from the group consisting of an alkoxy group, an acyloxy group, and at least one fluoropolymer [polymer (F)] comprising recurring units derived from at least one fluorinated monomer [monomer (FM)] and at least one monomer comprising at least one hydroxyl group [monomer (OH)], said solid composition (SCP) being obtained according to step (b) of the process as defined above.

For the purpose of the present invention, the term "membrane" is intended to denote a discrete, generally thin, interface which moderates permeation of chemical species in contact with it. This interface may be homogeneous, that is, completely uniform in structure (dense membrane), or it may be chemically or physically heterogeneous, for example containing voids, pores or holes of finite dimensions (porous membrane).

The membranes of the present invention typically have a thickness comprised between 5 μm and 500 μm, preferably between 10 μm and 250 μm, more preferably between 15 μm and 50 μm.

A further object of the present invention is a polymer electrolyte membrane which can be obtained by any of the processes as defined above.

The polymer electrolyte membrane of the present invention can be conveniently subjected to a thermal post-treatment in order to further improve its mechanical properties. Thermal post-treatment can be suitably carried out by submitting the membrane to a temperature in the range comprised between 100 and 150° C. for a time ranging from 20 minutes to 3 hours.

The polymer electrolyte membrane of the invention can be advantageously used as polymer electrolyte separator in electrochemical and photo-electrochemical devices.

Non-limitative examples of suitable electrochemical devices include, notably, secondary batteries, especially Lithium-ion batteries and Lithium-Sulfur batteries, and capacitors, especially Lithium-ion capacitors.

The invention further pertains to a metal-ion secondary battery comprising as polymer electrolyte separator the polymer electrolyte membrane of the present invention as defined above.

The metal-ion secondary battery is generally formed by assembling a negative electrode, the polymer electrolyte membrane of the present invention as defined above and a positive electrode.

The metal-ion secondary battery is preferably an alkaline or alkaline-earth secondary battery, more preferably a Lithium-ion secondary battery.

Non-limitative examples of suitable photo-electrochemical devices include, notably, dye-sensitized solar cells, photochromic devices and electrochromic devices.

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the present invention.

Raw Materials

Polymer FA: VDF/HEA (0.4% by moles)/HFP (2.5% by moles) copolymer having an intrinsic viscosity of 0.11 l/g in DMF at 25° C.

Polymer FB: VDF/HEA copolymer comprising 0.7% by moles of hydroxyethyalcrylate (HEA) having an intrinsic viscosity of 0.08 l/g in DMF at 25° C.

SOLEF® 11615VDF copolymer is a high viscosity VDF/HFP heterogeneous copolymer having a melt flow rate (at 230° C./21.6 kg, ASTM D1238) of about 3.3 g/10 min, and an inherent viscosity of about 2.0 dl/g (in N, N-dimethylformamide 4.0 g/l with 0.1 M LiBr at 25° C.), and a melting point (ASTM D3418) of 158-162° C., produced by Solvay Specialty Polymers.

Tetraethylorthosilicate (TEOS) commercially available as liquid from Aldrich Chemistry purity >99%.

Lithium bis(trifluoromethanesulfonyl)imide (LiTFSI).

Ionic Liquid (IL): N-Propyl-N-methylpyrrolidinium bis(trifluoromethanesulfonyl)imide (Pyr13TFSI) of formula:

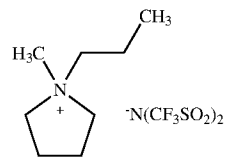

Citric acid: commercially available as crystals from Sigma Aldrich, purity 99%.

ES: 0.5 M of LiTFSI in Pyr13TFSI.

Measurement of the Ionic Conductivity (σ)

The polymer electrolyte membrane is placed in a ⅞ inch stainless steel Swagelok-cell prototype. The resistance of the polymer electrolyte membrane was measured at 25° C. and the ionic conductivity (σ) was obtained using the following equation:

$$\sigma = \frac{d}{(R_b \times S)}$$

wherein d is the thickness of the film, $R_b$ the bulk resistance and S is the area of the stainless steel electrode.

Determination of Intrinsic Viscosity of Polymer (F) (DMF at 25° C.)

Intrinsic viscosity [η] (dl/g) was determined using the following equation on the basis of the dropping time, at 25° C., of a solution obtained by dissolving polymer (F) in dimethylformamide at a concentration of about 0.2 g/dl, in an Ubbelhode viscosimeter $$[\eta] = \frac{\eta_{sp} + \Gamma \cdot \ln\eta_r}{(1+\Gamma) \cdot c}$$

where c is polymer concentration in g/dl;

ηr is the relative viscosity, i.e. the ratio between the dropping time of sample solution and the dropping time of solvent; $rs_p$ is the specific viscosity, i.e. $\eta_r-1$; Γ is an experimental factor, which for polymer (F) corresponds to 3.

Determination of $SiO_2$ Content in the Fluoropolymer Hybrid Organic/Inorganic Composite The amount of $SiO_2$ in the fluoropolymer hybrid organic/inorganic composite was measured by Energy Dispersive Spectroscopy (EDS) analysis of Silicon (Si) and Fluorine (F) elements on micrographs obtained from Scanning Electron Microscopy (SEM).

The SiO$_2$ content was determined by using the following equation (1):

$$SiO_2[\%]=[[SiO_2]/([SiO_2]+[F])]\times100 \quad (1)$$

wherein [SiO$_2$] and [F] from equation (1) are calculated using the following equations (2) and (3), respectively:

$$[SiO_2]=([Si_{EDS}]\times60)/28 \quad (2)$$

$$[F]=([F_{EDS}]\times64)/38 \quad (3)$$

wherein:
Si$_{EDS}$ and F$_{EDS}$ are the weight % of Si and F obtained by EDS,
60 is the molecular weight of SiO$_2$,
28 is the atomic weight of Si,
64 is the molecular weight of CH$_2$=CF$_2$, and
38 is the atomic weight of two F elements.

Preparation of Polymer FA

In a 80 liters reactor equipped with an impeller running at a speed of 250 rpm were introduced in sequence 50.2 kg of demineralised water and 3.80 g of METHOCEL® K100 GR and 15.21 g of Alkox® E45 as a couple of suspending agent. The reactor was purged with several sequences of vacuum (30 mmHg) and purged of nitrogen at 20° C. Then 187.3 g of a 75% by weight solution of t-amyl perpivalate initiator in isododecane. The speed of the stirring was increased at 300 rpm. Finally, 16.3 g of hydroxyethylacrylate (HEA) and 2555 g of hexafluoropropylene (HFP) monomers were introduced in the reactor, followed by 22.8 kg of vinylidene fluoride (VDF) were introduced in the reactor. The reactor was gradually heated until a set-point temperature at 55° C. and the pressure was fixed at 120 bar. The pressure was kept constantly equal to 120 bars by feeding 16.96 kg of aqueous solution containing a 188 g of HEA during the polymerization. After this feeding, no more aqueous solution was introduced and the pressure started to decrease. Then, the polymerization was stopped by degassing the reactor until reaching atmospheric pressure. A conversion around 81% of comonomers was obtained. The polymer so obtained was then recovered, washed with demineralised water and oven-dried at 65° C.

Preparation of Polymer FB

In a 80 lt. reactor equipped with an impeller running at a speed of 300 rpm were introduced in sequence 48204 g of demineralised water and 20.2 g of METHOCEL® K100 GR suspending agent. The reactor was vented and pressurized with nitrogen to 1 bar, then 10.8 g of hydroxyethylacrylate (HEA) monomer and 127.7 g of diethylcarbonate (DEC) were introduced in the reactor, followed by 204 g of a 75% by weight solution of t-amyl perpivalate initiator in isododecane, and 25187 g of vinylidene fluoride (VDF) monomer. The reactor was then gradually heated to 52° C. to a final pressure of 110 bar. Temperature was maintained constant at 52° C. throughout the whole trial. Pressure was maintained constant at 110 bar throughout the whole trial by feeding a 19.9 g/l aqueous solution of HEA monomer to a total of 16.5 kg and then the pressure started to decrease. The polymerization run was stopped by degassing the suspension until reaching atmospheric pressure. The polymer so obtained was then recovered, washed with demineralised water and oven-dried at 65° C. A conversion around 75% of the comonomers was obtained.

Example 1: Preparation of Solid Mixture (SM) at Different Temperatures

Solid mixtures (SM) were prepared starting from the mixture as below reported, in the presence of citric acid at different temperatures in a beaker of 50 ml capacity.

A liquid mixture was prepared by mixing:
ES: 12.5 g
TEOS: 10.0 g
water: 3.47 g (molar ratio TEOS:H$_2$O=1:4)
ethanol: 2.5 g (weight ratio TEOS:EtOH=4:1)
citric acid: 0.134 g (1 wt. % of TEOS+H$_2$O)

The liquid mixture thus obtained was allowed to react under magnetic stirring at 400 rpm at different temperatures.

The temperature and time for obtaining the solid mixtures are reported in Table 1 below.

TABLE 1

| T [° C.] | Time to obtain solid [h] |
|---|---|
| 30 | 22 |
| 40 | 8 |
| 50 | 4 |
| 60 | 2 |

The results show that solid mixtures (SM) can be formed in a shorter time when the temperature is increased.

Example 2: Manufacture of the Polymer Electrolyte Membrane with Polymer FA

1) Preparation of Solid Mixture (SM)

In a 500 ml beaker equipped with a magnetic stirrer running at a speed in the range from 200 to 400 rpm the following ingredients were introduced in sequence:
ES: 99.75 g
TEOS: 48.29 g
water: 16.77 g (molar ratio TEOS:H$_2$O=1:4)
ethanol: 12.07 g (weight ratio TEOS:EtOH=4:1)
citric acid: 0.65 g (1 wt. % of TEOS+H$_2$O)

Theoretical amount of SiO$_2$ produced in each batch was 1.89 g (17.91% of the starting TEOS, water, ethanol components); the composition was maintained under vigorous stirring (400 rpm) at RT for 48 hours. Then, it was put in the oven at 70° C. for 48 hours and then milled to fine particles finer than 100 microns.

2) Preparation of Polymer Electrolyte Membrane Comprising a Fluoropolymer Hybrid Organic/Inorganic Composite:

The solid mixture (SM) obtained in 1) was mixed with 60 g of Polymer FA in a ratio such to obtain finally the following composition: 35/8/57 (Polymer FA/SiO$_2$/ES). This composition was introduced using a gravimetric feeder into the feeding hopper of a twin screw co-rotating intermeshing extruder (Leistritz 18 ZSE 18 HP having a screw diameter D of 18 mm and a screw length of 720 mm (40 D)). The barrel was composed of eight temperature controlled zones and a cooled one that allows to set the desired temperature profile. The molten polymer went out from a die, composed of a flat profile of 1 mm thick and 40 mm length. The extrudate film was stretched between two cylinders of diameter 100 mm and width 100 mm with a gap from 100-500 um. The extrudated film was cooled in air and it has a thickness in between of 100 and 150 microns.

The temperature profile used is reported in Table 2 here below. The extruder rotation speed was 180 rpm. The throughput was about 0.5 Kg/h.

TABLE 2

| Zone | 1 | 2 | 3 | 4 | 5 | 6 | 7 | 8 |
|---|---|---|---|---|---|---|---|---|
| Profile [° C.] | 170 | 170 | 170 | 170 | 175 | 180 | 185 | 190 |

The ionic conductivity of the resulting membrane is shown in Table 4.

Composition of the polymer electrolyte: 57% ES, 8% $SiO_2$, 35% polymer FA.

Example 3: Manufacture of a Polymer Electrolyte Membrane with Polymer FA

The same procedure as in Example 2 was followed, with the exception that the Polymer FA was charged together with the other ingredients in 1) to provide a solid composition (SCP) that was fed to the extruder as in Example 2 at the same extrusion conditions.

The ionic conductivity of the resulting membrane is shown in Table 4.

Composition of the polymer electrolyte: 57% ES, 8% $SiO_2$, 35% polymer FA.

Example 4: Manufacture of the Polymer Electrolyte Membrane with Polymer FA

The same procedure as in Example 2 was followed, with the exception that in 1) the following ingredients were introduced in the beaker:
ES: 99.75 g
TEOS: 48.29 g
formic acid: 26.8 g The ionic conductivity of the resulting membrane is shown in Table 4.

Composition of the polymer electrolyte: 57% ES, 8% $SiO_2$, 35% polymer FA.

Example 5: Manufacture of the Polymer Electrolyte Membrane with Polymer FA

The same procedure as in Example 4 was followed, with the exception that the Polymer FA was charged together with the other ingredients in 1) to provide a solid composition (SCP) that was fed to the extruder as in Example 2 at the same extrusion conditions.

The ionic conductivity of the resulting membrane is shown in Table 4.

Example 6: Manufacture of the Polymer Electrolyte Membrane with Polymer FA

The same procedure as in Example 2 was followed, with the exception that in 1) the following ingredients were introduced in the beaker:
ES: 99.75 g
TEOS: 48.29 g
water: 16.77 g (molar ratio TEOS:$H_2O$=1:4)
ethanol: 12.07 g (weight ratio TEOS:EtOH=4:1)

The composition was maintained under vigorous stirring (400 rpm) at 60° C. for 23 hours. Then, it was put in the oven at 70° C. for 48 hours and then milled to fine particles finer than 100 microns.

The ionic conductivity of the resulting membrane is shown in Table 4.

Example 7: Manufacture of the Polymer Electrolyte Membrane with Polymer FA

1) Preparation of Solid Mixture (SM)

In a 500 ml beaker equipped with a magnetic stirrer running at a speed in the range from 200 to 400 rpm the following ingredients are introduced in sequence:
ES: 127.75 g
TEOS: 48.29 g
water: 16.77 g (molar ratio TEOS:$H_2O$=1:4)
ethanol: 12.07 g (weight ratio TEOS:EtOH=4:1)
citric acid: 0.65 g (1 wt. % of TEOS+$H_2O$)

Theoretical amount of $SiO_2$ produced in each batch was 1.89 g (17.91% of the starting TEOS, water, ethanol components); the composition was maintained under vigorous stirring (400 rpm) at RT for 48 hours. Then, it was put in the oven at 70° C. for 48 hours and then milled to fine particles finer than 100 microns.

2) Preparation of Polymer Electrolyte Comprising a Fluoropolymer Hybrid Organic/Inorganic Composite:

The solid mixture (SM) obtained in 1) was mixed with 33.25 g of Polymer FA in a ratio such to obtain finally the following composition: 19/8/73 (Polymer FA/$SiO_2$/ES). This composition was introduced manually into the feeding hopper of a twin screw co-rotating intermeshing extruder (Leistritz 18 ZSE 18 HP having a screw diameter D of 18 mm and a screw length of 720 mm (40 D)). The barrel was composed of eight temperature controlled zones and a cooled one that allows to set the desired temperature profile. The molten polymer went out from a die, composed of a flat profile of 1 mm thick and 40 mm length. The extrudate film was stretched between two cylinders of diameter 100 mm and width 100 mm with a gap from 100-500 microns. The extrudated film was cooled in air and it has a thickness in between of 300 and 350 microns. The temperature profile used is reported in Table 3 here below. The extruder rotation speed was 180 rpm.

TABLE 3

| Zone | 1 | 2 | 3 | 4 | 5 | 6 | 7 | 8 |
|---|---|---|---|---|---|---|---|---|
| Profile [° C.] | 170 | 170 | 170 | 170 | 175 | 180 | 185 | 190 |

The ionic conductivity of the resulting membrane is shown in Table 4.

Composition of the polymer electrolyte: 57% ES, 8% $SiO_2$, 35% polymer FA.

Example 7bis: Manufacture of the Polymer Electrolyte Membrane with Polymer FA The membrane provided in Example 7 was maintained at 130° C. for 120 minutes as a post-treatment process to improve its mechanical properties.

Example 8—Manufacture of the Polymer Electrolyte Membrane with Polymer FA

The same procedure as in Example 2 was followed, with the exception that the Polymer FA was charged together with the other ingredients in 1) to provide a solid composition (SCP) in the form of a easy-flowing powder that was fed to the extruder as in Example 2 at the same extrusion conditions.

The ionic conductivity of the resulting membrane is shown in Table 4.

Composition of the polymer electrolyte: 57% ES, 8% SiO$_2$, 35% polymer FA.

Example 8bis: Manufacture of the Polymer Electrolyte Membrane with Polymer FA

The membrane provided in Example 8 was maintained at 130° C. for 120 minutes as a post-treatment process to improve its mechanical properties.

Example 9—Comparative—: Manufacture of Fluoropolymer Hybrid Organic/Inorganic Composite Membrane with Polymer FB A fluoropolymer hybrid organic/inorganic composite was prepared according to the process disclosed in WO 2014/067816, wherein polymer FB has been extruded and reacted with the metal compound in the absence of electrolyte solution, leading to a polymer FB/SiO$_2$ composite 75/25% by weight. The composite was obtained in the form of pellets. 10.08 g of said pellets were charged into the feeding hopper of a mini-extruder with 13.92 g of ES and kept at 180° C. After 2 minutes the product was discharged. The product resulting from extrusion had some transparent parts and some opaque parts. The extrudate did not show much consistency of the melt.

Example 10—Comparative—: Manufacture of Fluoropolymer Hybrid Organic/Inorganic Composite with Polymer SOLEF® 11615

The same procedure as in Example 8 was followed, with the exception that polymer SOLEF® 11615 was used.

The extrusion did not lead to a homogeneously extruded membrane. There were zones having different texture and appearance, thus proving the need of having a functionalised fluoropolymer (Polymer (F)) capable of forming a continuous inorganic-organic network.

Example 11—Ionic Conductivity of the Samples Obtained in Examples 2-8

In Table 4 the ionic conductivity of the membranes obtained in Examples 2 to 8 is reported:

TABLE 4

| Example | Ionic conductivity (S/cm) at 25° C. |
| --- | --- |
| 2 | $1.75^{E-05}$ |
| 3 | $1.92^{E-05}$ |
| 4 | $6.26^{E-06}$ |
| 5 | $2.24^{E-05}$ |
| 6 | $2.65^{E-05}$ |
| 7 | $2.09^{E-04}$ |
| 7bis | $3.09^{E-04}$ |
| 8 | $2.38^{E-04}$ |
| 8bis | $2.06^{E-04}$ |

The polymer electrolyte membranes according to the present invention show ionic conductivity that makes them suitable for use in battery applications, such as separators in Li-ion batteries.

Example 12: Mechanical Properties of Membranes Obtained in Examples 7, 7bis, 8 and 8bis at Room Temperature (23° C.)

The mechanical properties were measured in a Dynamometer model 5966 Instron. The sample dimension is: 22×80 mm, Gap between the grips 32 mm, Test velocity: 5 mm/min In Table 5 the mechanical properties of the membranes obtained in Examples 7, 7bis, 8 and 8bis are reported:

TABLE 5

| Example | Young's modulus (Mpa) | Max stress (Mpa) | Strain at break (%) |
| --- | --- | --- | --- |
| 7 | 19 | 3.1 | 32 |
| 7bis | 12 | 2.3 | 39 |
| 8 | 18 | 2.1 | 32 |
| 8bis | 11 | 2.7 | 41 |

The data demonstrate that the post-treatment improves the mechanical properties of the extruded films without jeopardizing the ionic conductivity.

The invention claimed is:

1. A process for manufacturing a polymer electrolyte membrane based on a fluoropolymer hybrid organic/inorganic composite, said process comprising the following steps:
   (i) providing a mixture that comprises:
      a metal compound of formula (I)

$$X_{4-m}AY_m \qquad (I)$$

wherein m is an integer from 1 to 4, A is a metal selected from the group consisting of Si, Ti and Zr, Y is a hydrolysable group selected from the group consisting of an alkoxy group, an acyloxy group and a hydroxyl group, X is a hydrocarbon group, optionally comprising one or more functional groups,
      an electrolyte solution [solution (ES)] comprising at least one metal salt [metal salt (S)] and a liquid medium [medium (L)];
      optionally, at least one acid catalyst; and
      optionally, an aqueous liquid medium [medium (A)];
   (ii) partially hydrolysing and/or polycondensing the metal compound of formula (I) by stirring the mixture provided in step (i) until the obtainment of a solid mixture (SM) that comprises a metal compound including one or more inorganic domains consisting of =A-O-A= bonds and one or more residual hydrolysable groups Y [metal compound (M)], wherein A and Y are as above defined;
   and
   (iii) mixing the solid mixture (SM) provided in step (ii) with at least one fluoropolymer [polymer (F)] comprising recurring units derived from at least one fluorinated monomer [monomer (FM)] and at least one monomer comprising at least one hydroxyl group [monomer (OH)], so as to provide a solid composition (SC);
   and
   (iv) processing the solid composition (SC) provided in step (iii) in the molten state, so that at least a fraction of hydroxyl groups of the monomer (OH) of polymer (F) reacts with at least a fraction of residual hydrolysable groups Y of said compound (M), so as to obtain a polymer electrolyte membrane comprising a fluoropolymer hybrid organic/inorganic composite including the electrolyte solution(ES).

2. The process according to claim 1, wherein in step (ii) the mixture provided in step (i) is subjected to a stirring at a temperature of at least 30° C. for a time comprised in the range of from 24 to 48 hours.

3. The process according to claim 1, wherein step (ii) further comprises a step (ii$_{bis}$) of drying the solid mixture (SM) obtained in step (ii) at a temperature of at least 60° C.

4. The process according to claim 1, wherein step (ii) further includes a step (ii$_{ter}$) of comminuting the solid mixture obtained in step (ii) or in step (ii$_{bis}$) so as to provide the solid mixture (SM) in the form of fine powder.

5. The process according to claim 1, wherein the metal compound of formula (I) is a non-functional compound selected from the group consisting of triethoxysilane, trimethoxysilane, tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, and tetra-n-stearyl zirconate.

6. The process according to claim 1, wherein the metal salt(S) is selected from the group consisting of LiI, LiPF$_6$, LiBF$_4$, LiClO$_4$, lithium bis(oxalato) borate ("LiBOB"), LiCF$_3$SO$_3$, LiN(CF$_3$SO$_2$)$_2$ ("LiTFSI"), LiN(C$_2$F$_5$SO$_2$)$_2$, Me[N(CF$_3$SO$_2$)(R$_F$SO$_2$)]$_n$ with R$_F$ being C$_2$F$_5$, C$_4$F$_9$, CF$_3$OCF$_2$CF$_2$, LiAsF$_6$, LiC(CF$_3$SO$_2$)$_3$, Li$_2$S$_n$ and combinations thereof, and wherein Me is a metal and n is 1 or 2 and the valence of said metal.

7. The process according to claim 1, wherein electrolyte solution(ES) consists of at least one ionic liquid (IL) and LiTFSI.

8. The process according to claim 1, wherein the acid catalyst is an organic acid.

9. The process according to claim 1, wherein the medium (A) consists of water and ethanol.

10. The process according to claim 1, wherein the monomer (OH) is selected from the group consisting of (meth)acrylic monomers of formula (V) and vinylether monomers of formula (VI)

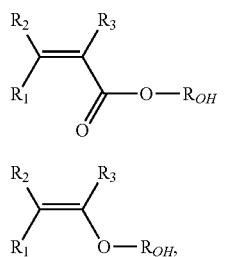

wherein each of R$_1$, R$_2$, R$_3$, equal to or different from each other, is independently a hydrogen atom or a C$_1$-C$_3$ hydrocarbon group and R$_{OH}$ is a C$_1$-C$_5$ hydrocarbon moiety comprising at least one hydroxyl group.

11. The process according to claim 1, wherein the polymer (F) comprises:
(a) at least 60% by moles of vinylidene fluoride (VDF);
(b) optionally, from 0.1% to 15% by moles of a fluorinated comonomer selected from the group consisting of chlorotrifluoroethylene (CTFE), hexafluoropropene (HFP), tetrafluoroethylene (TFE), trifluoroethylene (TrFE), perfluoromethylvinylether (PMVE) and mixtures thereof; and
(c) from 0.05% to 10% by moles of monomer (OH) of formula (V)

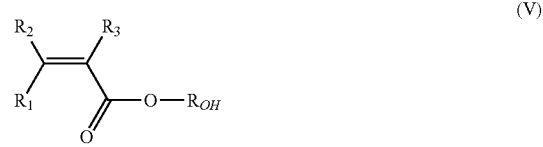

wherein each of R$_1$, R$_2$, R$_3$, equal to or different from each other, is independently a hydrogen atom or a C$_1$-C$_3$ hydrocarbon group and R$_{OH}$ is a C$_1$-C$_5$ hydrocarbon moiety comprising at least one hydroxyl group.

12. A solid composition (SC) obtained according to step (iii) of the process of claim 1.

13. A polymer electrolyte membrane obtained by the process according to claim 1.

14. A process for manufacturing a polymer electrolyte based on a fluoropolymer hybrid organic/inorganic composite, said process comprising the following steps:
(a) providing a mixture that comprises:
a metal compound of formula (I)

wherein m is an integer from 1 to 4, A is a metal selected from the group consisting of Si, Ti and Zr, Y is a hydrolysable group selected from the group consisting of an alkoxy group, an acyloxy group and a hydroxyl group, X is a hydrocarbon group, optionally comprising one or more functional groups,
an electrolyte solution [solution (ES)] comprising at least one metal salt [metal salt (S)] and a liquid medium [medium (L)];
optionally, at least one acid catalyst; and
optionally, an aqueous liquid medium [medium (A)]; and
at least one fluoropolymer [polymer (F)] comprising recurring units derived from at least one fluorinated monomer [monomer (FM)] and at least one monomer comprising at least one hydroxyl group [monomer (OH)];
and
(b) partially hydrolysing and/or polycondensing the metal compound of formula (I) by stirring the mixture provided in step (a) until the obtainment of a solid composition (SCP) that comprises a metal compound including one or more inorganic domains consisting of =A-O-A= bonds and one or more residual hydrolysable groups Y [metal compound (M)], wherein A and Y are as above defined and at least one polymer (F) as above defined;
and
(c) processing the solid composition (SCP) provided in step (b) in the molten state, so that at least a fraction of hydroxyl groups of the monomer (OH) of polymer (F) reacts with at least a fraction of residual hydrolysable groups Y of said compound (M), so as to obtain a polymer electrolyte membrane comprising a fluoropolymer hybrid organic/inorganic composite including the electrolyte solution(ES).

15. The process according to claim 14, wherein step (b) includes a further step (b$_{bis}$) of drying the composition obtained in step (b) at a temperature of at least 60° C.

16. The process according to claim 14, wherein step (b) further includes a step (b$_{ter}$) of comminuting the solid mixture obtained in step (b) or in step (b$_{bis}$), so as to provide the solid mixture in the form of fine powder.

17. A solid composition (SCP) obtained according to step (b) of the process of claim 14.

\* \* \* \* \*